Jan. 23, 1968  G. A. BENTLEY ET AL  3,365,213

SMALL JOINT

Filed June 28, 1965  3 Sheets-Sheet 1

# United States Patent Office 3,365,213
Patented Jan. 23, 1968

3,365,213
SMALL JOINT
Gustavus A. Bentley, Redwood City, John H. Bradfute, Santa Clara, and Vasalie L. Peickii, Hillsborough, Calif., assignors to Federal-Mogul Corporation, Detroit, Mich., a corporation of Michigan
Filed June 28, 1965, Ser. No. 467,598
2 Claims. (Cl. 280—95)

ABSTRACT OF THE DISCLOSURE

This flex joint comprises two rods, one having a ring at one end thereof, the other having a generally cylindrical stud, and an elastomeric annulus bonded to substantially the entire inner surface of the ring and to the outer surface of the stud above, below and inside the ring and substantially filling the space between the stud and the ring. The opening through the ring flares conically at about 30° included angle from a narrow diameter at the center to a wider diameter at each end. The stud passes axially through the opening and has an enlarged head, of sufficient size to prevent the stud from being pulled through the ring. The narrowest diameter of the ring is about 130% of the diameter of the stud, and the stud is tipped at about 7½° to said ring in the opposite direction to that where most tipping force is expected to be exerted. Hence, a force tending to tip one rod relative to the other is transmitted through the elastomer of the joint from the one rod to the other.

---

This invention relates to an improved mechanical linkage joint.

Like the elastomeric flex joints set forth in application Ser. No. 330,518, filed Dec. 9, 1963, and application Ser. No. 401,746, filed Aug. 10, 1964, both by Vasalie L. Peickii et al., and like the elastomeric flex joints set forth in pending application Ser. No. 461,968, filed June 7, 1965 by Gustavus A. Bentley, the joint of this invention comprises a ring member and a metal stud inside the ring and separated from it by elastomer through which the action of the joint takes place. However, the joint of the present invention differs from those in that its purposeful operation is accomplished by a tipping action of the stud relative to the surrounding ring; it acts to absorb some shock both by relative translation and by torsion. In contrast, the purposeful operation of the other flex joints referred to is principally by torsion, the stud turning relative to the ring on a generally horizontal plane.

An important use of the flex joint of this invention is in certain joints of a vehicle steering system such as for automobiles and trucks, for example in the steering system described in application Ser. No. 452,539, filed May 3, 1965, by V. L. Peickii et al., where it is used as an intermediate joint. In that system, the joint closest to the wheel operates in torsion and is similar to those shown in application Ser. No. 461,968; whereas, the joint of the present invention is used inbetween the intermediate arm and the connecting rod. More important, the joint of this invention is set at right angles with respect to the previous joint; its operation is therefore considerably different and difficult; baffling problems had to be solved in relation to its structure to enable its use.

In automobiles, space is at a premium, and since in most automobiles the engine is in front, there is little space for anything in the vicinity of the center portion of the car front, certainly not for large joint members. Heretofore, ball-joint members have been used for these joints, but ball joints have worn during normal operation and, being subjected here to shock and vibration, they have worn out far more quickly than they should. They required frequent maintenance and lubrication to operate properly, and they had the bad fault of transmitting shock and vibration from the road wheels to the steering wheel undiminished, unless some means external to them was provided for lessening such transmission.

The present invention can also be used in universal joints, wheel suspensions, shock absorber arms and other places where ball joints and hinges have been used, and in many of these locations it has substantially all the advantages of the ball joint while at the same time being simpler, requiring no maintenance, and serving to dampen shock and vibration and thereby to transfer less of them through the system. Moreover, the joint is substantially free from the possibility of wear that results from sliding contact. In many applications the joint of this invention has a much longer life than the joints heretofore in use. Furthermore, the joint is fail-safe, in that if the elastomer should fail completely, interlocking metal parts are still unable to come apart.

When used in a steering linkage, the flex joints of this invention help to reduce the road and front wheel noise and vibration that is transmitted to the steering linkage and as a result give a quieter and more solid-sounding ride. Another important point is that the joints have an inherent centering force, and this and their lack of friction enable alterations in the front end suspension system that lower the steering wheel rim force to give a center detent feel. In contrast to conventional joints, in which free play increases with wear, the joints of this invention have no free play at any time since there is no clearance between their moving parts. There being no wearing surfaces, the joints of this invention remain tight during their entire service life, and the joint of this invention can have a life equal to the life of the car. Since they do last so long, it is not necessary to make concessions to ease of replacement, and the tie rod joints can be made integral with the connecting rod of the steering system.

Other objects and advantages of the invention will appear from the following description of the preferred embodiments.

Figure 1:
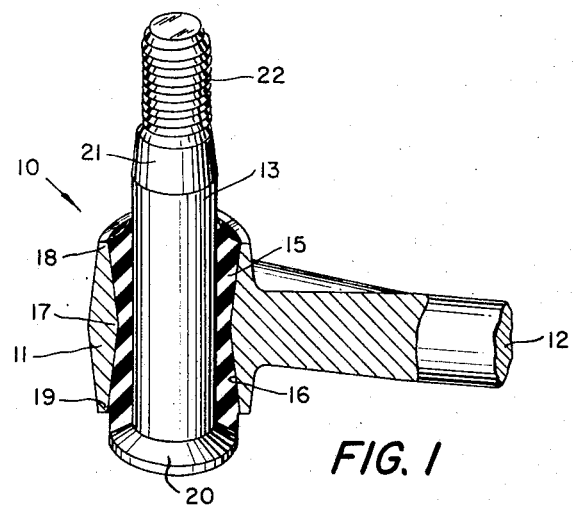
FIG. 1 is a fragmentary view in perspective and partly in section of a flex joint embodying the principles of the invention, attached to a portion of a connecting rod member.
Figures 2, 3:
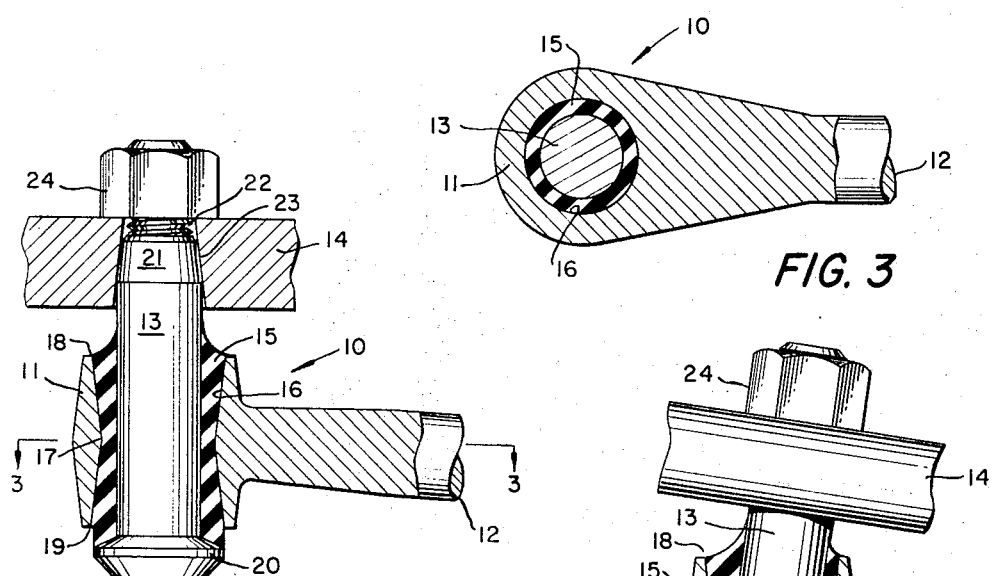
FIG. 2 is a fragmentary view in elevation and in section of the flex joint of FIG. 1 secured to an intermediate arm in a steering system.
FIG. 3 is a view in section taken along the line 3—3 in FIG. 2.
Figure 4:
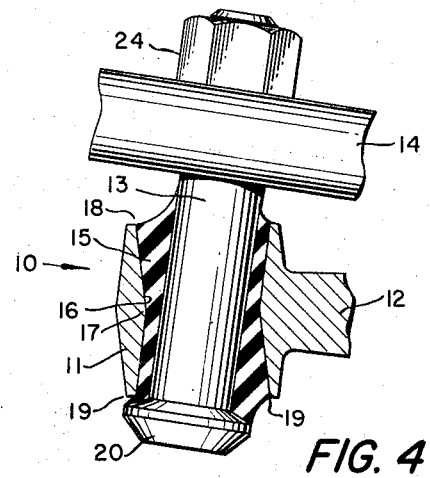
FIG. 4 is a view generally similar to FIG. 2 but showing one arm tipped relative to the other, showing how the tipping force is accommodated.

The joint 10 shown in FIGS. 1–4 comprises a ring 11 secured to a rod 12 and a pin or stud 13 secured (in FIGS. 2 and 4) to an arm 14 which is to move relative to the rod 12. Between the ring 11 and the stud 13, elastomer 15 is bonded to both the ring 10 and the stud 13. This elastomer 15 transmits force from one member 11 or 13 to the other, while dampening out some of the forces of vibration or shock.

The inner periphery of the ring 11 is shaped so that its inner bore 16 flares outwardly from the center 17 to larger-diameter end portions 18 and 19. The angle of flare may be about 7½ degrees on each side, the amount being varied to provide whatever tipping limitations are required. The two intersecting cone frustums do not need to meet at a sharp corner in the center 17 of the ring; in fact, the center portion may have a gentle curve or a short central cylindrical portion. Sharp corners are undesirable for they tend to introduce stress raisers which are focal points for premature failure of rubber. However, the invention is such that they can be used with less danger in this installation than is normally encountered.

The pin or stud 13 preferably has a main cylindrical shank, a shape preferable to having the ring cylindrical and the shank tapered, because such tapering of the shank weakens the shank and because it is easier to provide the desired shape of the ring 11 in forging than it is to have to roll-taper the stud 13. At its lower end, the stud 13 is provided with an enlarged head 20 of a size to assure fail-safe interlocking, preventing the stud 13 from being pulled upwardly out of the ring 11 even if the rubber 15 should be completely absent. Near the upper end of the stud 13 is a tapered portion 21, followed above by a threaded portion 22. The rod 14 is preferably provided with a frustoconical opening 23 to fit onto the tapered wall 21, and is tightened thereon by a nut 24 which is threaded on the threaded portion 22.

The elastomer 15 is preferably of the neoprene type, although it may be another elastomer, the type depending upon the environment in which the device is to be used. Preferably, the elastomer 15 is bonded to substantially the full cylindrical shank of the stud 13 and is at least bonded to that portion of the stud 13 which is inside the ring 11, and is also bonded to the full internal surface 16 of the ring 11. As shown, it preferably also extends on the stud 13 above and below the ring 11 and may be bonded to the fail-safe head 20, as well.

When the arm 14 is moved, a force tending to incline the stud 13 relatively to the ring 11 is set up, and the elastomer 15 transmits the force to the rod 12. The elastomer 15 may be made relatively soft or relatively hard in order to impart any degree of plushness or absorption of initial motion before the actual motion of the second part starts. Excellent dampening characteristics may be provided without a significant change in actual response, so the user can hardly feel the difference in response.

Figure 5:
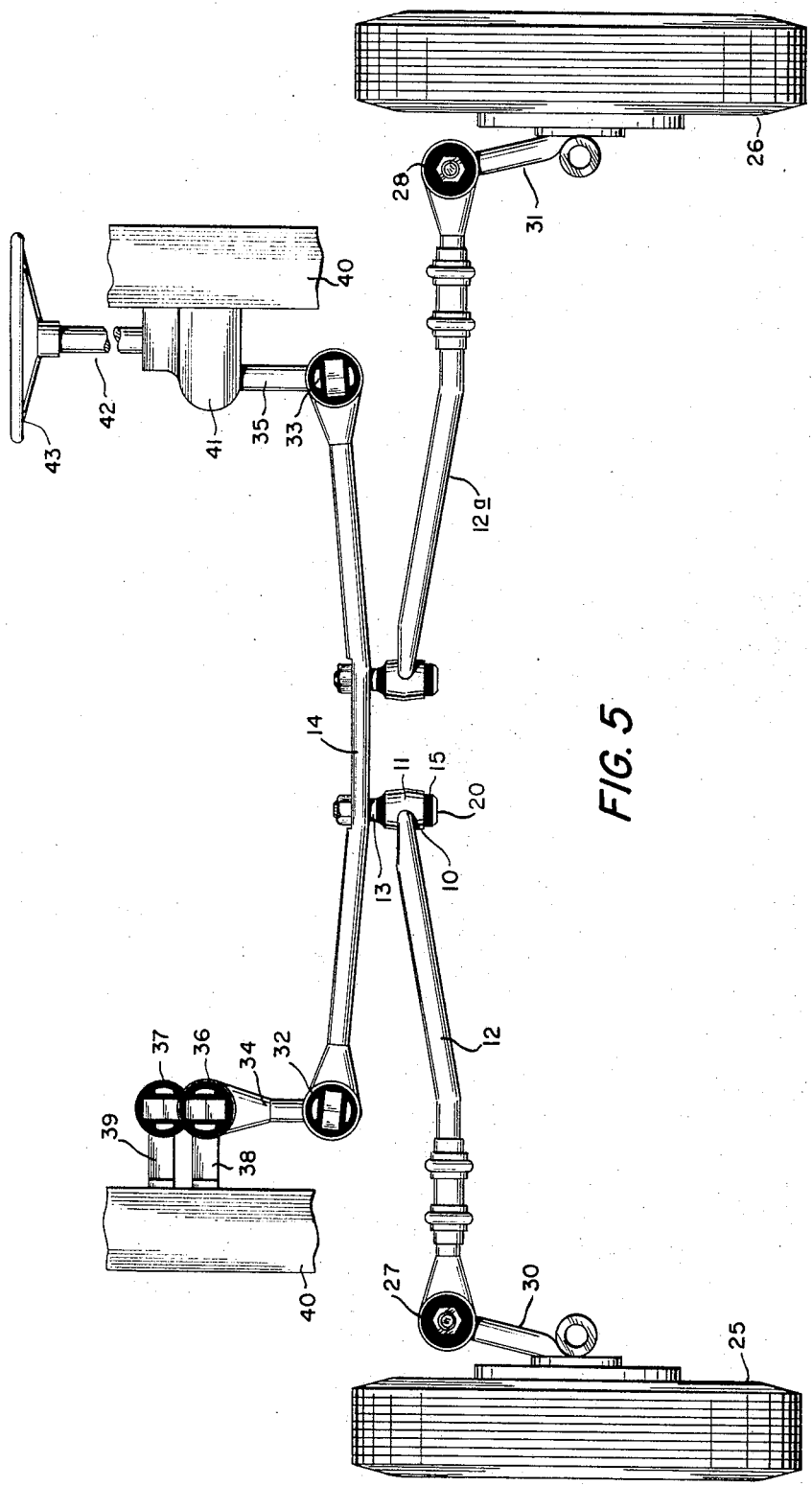
FIG. 5 is a schematic view mostly in plan and broken at the steering column of an automobile steering system incorporating joints of the present invention as intermediate joints.

The installation shown in FIG. 5 will be helpful in considering the importance of the flex joint and its operation. Here, connecting rods 12 and 12a are connected respectively to right and left hand wheels 25, 26 through steering joints 27, 28 of the type described in Ser. No. 461,968, filed June 7, 1965, which act normally in torsion, the joints 27 and 28 connecting steering arms 30 and 31 to the connecting rods 12 and 12a. The novel joints 10 and 10a of the present invention join the connecting rods 12 and 12a to the intermediate rod 14. Flex joints 32 and 33, which may be generally similar to the type already described may be used at each end of the intermediate rod 14. Thus, a joint 32 connects the intermediate rod 14 to an idler arm 34, and the joint 33 connects the arm 14 to a pitman arm 35. The idler arm 34 may be clevised and its two outer ends connected by similar joints 36 and 37 to a main vehicle frame 40 through brackets 38 and 39. The pitman arm 35 is directly connected to the gears in a steering gear box 41, and the steering gear box 41 is connected itself directly to the frame 40. The gears in the box 41 are connected to a steering shaft 42 and thence to a steering wheel 43.

As stated earlier, the function of the joint 10 of this invention is to accommodate the required motion by tipping action rather than by a rotating action during the normal process of steering a vehicle. In addition, the angle through which the joint 10 operates is the angle caused by the forward movement of the outer joint 27 plus a small angle caused by the rearward translation of the intermediate arm. In contrast, the angle through which each of the outside joints 27, 28 operates is equal to the angle of the joint 10 or 10a plus the larger angle through which the road wheels 25, 26 turn. Since the angle through which the intermediate joint 10, 10a operates is necessarily much smaller than the angle through which the outer joint 27, 28 operates, it is desirable for the joint 10, 10a to be capable of a more limited range of angular movement than the outer joint 27, 28. The smaller range of angular movement enables a decrease in the thickness of the elastomer while still retaining the rubber elongation and stress at the same level. Thinner elastomer, in turn, provides a stiffer joint that prevents excessive loss of positive steering feel. Thinner elastomer also results in a road shock absorption location that has a different resonant frequency from that of the outer joints.

A relatively small degree of motion is required in the intermediate joint 10. Hence, the use of the round stud 13 surrounded by the ring 11 which has a bore 16 that flares outwardly is an optimum configuration for this installation. At the desired loads in an automotive steering system, the outward taper of the bore 16 means that the minimum diameter (at 17) of the bore 16 can be approximately 130% of the diameter of the stud 13. The taper is then made essentially equal to the amount of tip required for the stud 13 up to approximately 15° (30° included angle). Beyond 15° the ratio between stud diameter and minimum hole diameter would have to be increased in order to avoid metal-to-metal contact which would otherwise occur at approximately 34° inclination of the stud.

A constriction at the center of the surrounding ring reduces the amount of radial movement possible between the ring and the stud, making the assembly stiffer. At the same time, a greater degree of tipping is possible for the stud when the sides of the hole within which it is contained diverge towards the end. In addition, as the degree of tipping increases, the angularity between the taper of the side of the hole and the stud also increases on the tension side, while on the compression side the stud and the hole become more nearly parallel. Such parallelism imparts greater restraining forces by reducing elastic flow and column effect within the rubber under compression and reduces both radial and axial movement. For long life, it is important for the rubber at its points of greatest elongation not to exceed the optimum 50% elongation.

In actual operation a typical end joint 27, 28 is usually required to be capable of tipping up to 15° in any direction, while it is capable of rotating clockwise or counter clockwise up to about 48°. An intermediate joint, however is usually required to tip only about 15° in one direction and to undergo rotation of about 10° clockwise and 10° counterclockwise. The limited motion of the intermediate joint 10 enables considerable reduction of the thickness of rubber 15 between the stud 13 and the ring 11, and since the action wanted is primarily tipping and no great rotation is required, it means that no holes are required through the rubber.

With the intermediate joint tipping only 15° in one direction it becomes possible to preload the intermediate joints 7½° in the opposite direction on installation, or to mold them in that position, and to get a full 15° of tipping by first unloading the 7½° of preload and then continuing the motion for another 7½° to produce the load in the next quadrant. The size of the joint 10 may thereby be reduced while maintaining the same relative 50% elongation of the rubber, or if the size is maintained, the relative elongation may be reduced by about half, to thereby increase the flex life of the joint which increases in an exponential relation. Preloading the intermediate joint changes the shape of the steering wheel force curve and enables the use of configurations in which the very positive center detent feel is obtained resulting in more effortless steering of the normal range without building up required effort on the steering wheel until the maximum turns are required.

When the steering wheel 43 is turned, the gears in the gear box 41 cause the pitman arm 35 to turn. As the pitman arm 35 moves through its arc, it causes the intermediate arm 14 and its attached intermediate joint studs 13 and 13a to move. The idler arm 34 restrains the intermediate arm 14 to movement parallel to its original position perpendicular to the vehicle centerline. The relative tipping motion of the studs 13 and 13a acts through the elastomer 15 and 15a of the joints 10 and 10a to move the rods 12 and 12a through them and the joints 27 and 28 to cause an angular change in the road wheel position, thereby steering the car. The steering force is transmitted through the joints 10 and 10a by tension and compression of the rubber 15 along the axis of the arms 12 and 12a. That component of force which is used to tip the rings 11 and 11a relative to the studs 13 and 13a represents stored energy, which gives a novel and distinctive form to the force curves for these joints.

In both the inner joints 10, 10a and the outer joints 27, 28, the elastomer is loaded or unloaded according to the steering position. Now, the linkage assembly 30, 27, 12, 10, 14 and the linkage assembly 31, 28, 12a, 10a, 14 are in mirror-image relation to each other, and they co-act to build up potential energy during turns which, upon release of the steering wheel, releases kinetic energy for restoring the road-engaging wheels 25 and 26 to their straight-ahead position.

In a left turn, the left wheel turns in a shorter radius than does the right wheel; vice versa for a right turn. However, the co-action of the parts means that the forces for the system are balanced, so that the forces within the system are equal and opposite and the forces tending to straighten one wheel also generally tend to straighten the other wheel, so that the straightening force of the system acts as a unit on both wheels.

Figure 6:
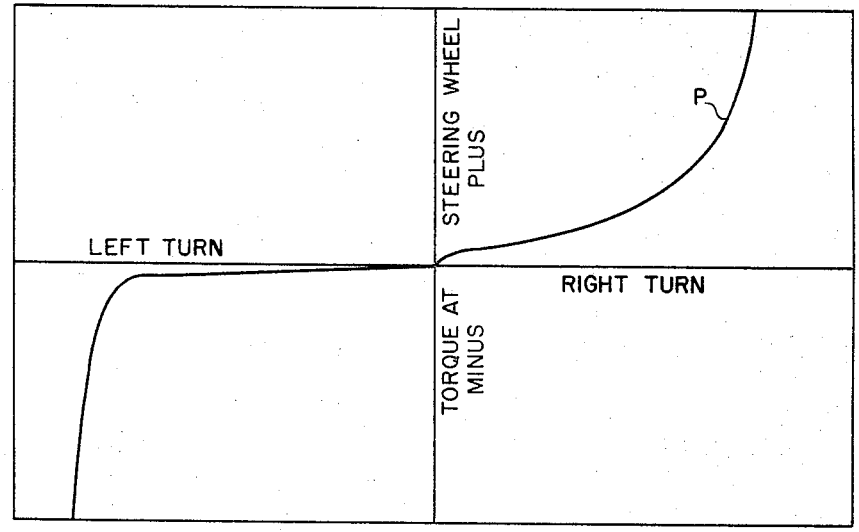
FIG. 6 is a force diagram showing the force curve for a joint of this invention.
Figure 7:
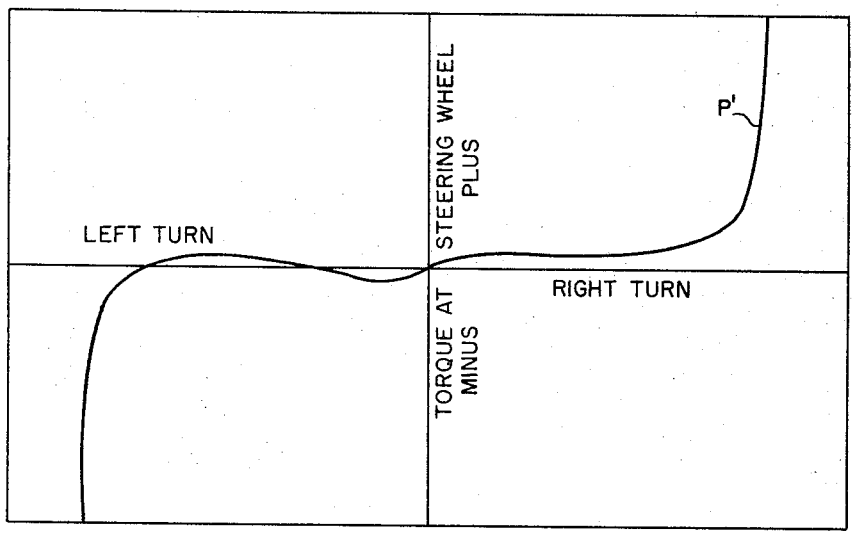
FIG. 7 is a similar force diagram for a preloaded joint of this invention.

In FIG. 6 is shown a force curve P for a joint 10, showing its unusual form. Also, in FIG. 7 is shown a curve P' obtained from a preloaded joint 10. These unique force curves show how different are the results of using the joint 10 of this invention. Preloading, for example, greatly enhances center detent feel.

Shock absorption is provided mainly by limited translation of the stud 13 relative to the ring 11 against the elastomer 15. The connecting rod 12 or 12a is enabled to follow vertical movement of its associated road engaging wheel by limited relative rotation of the stud 13 and ring 11 transmitted through the elastomer 15.

Unlike the outer joints 27 and 28, the inner joints 10 and 10a are mounted horizontally rather than vertically, the stud or pin 13 being parallel to the centerline of the vehicle. When the steering wheel 43 is turned, the effect on the inner joints 10, 10a is a tendency to cause the pin 13 to tip relative to the ring 11, rather than to cause relative rotation as in the outer joints 27, 28. All of the joints 27, 28 and 10, 10a absorb shock by limited relative translation of their ring 11 and their pin or stud, but whereas the metal members of the outer joints 27, 28 are caused to tip relative to each other when the road engaging wheel moves vertically, the members 11, 13 of the inner joints 10 and 10a are thereby caused to rotate through a small angle.

To those skilled in the art to which this invention relates, many additional changes in construction and widely differing embodiments of the invention will suggest themselves without departing from the spirit and scope of the invention as defined in the claims.

What is claimed is:
1. A flex joint, including in combination:
   a first rod having a ring at one end thereof, said ring having an opening therethrough which flares from a narrow diameter at the center to a wider diameter at each end;
   a second rod having secured thereto a generally cylindrical stud, said stud passing axially through said opening and having an enlarged head on the opposite side of said from said second rod, said head being of sufficient size to prevent the stud from being pulled through said ring, and
   a vaidless elastomeric annulus bonded to both the inner surface of the ring and the outer surface of the stud and substantially filling the space between them,
   said stud bonded in said elastomer with its axis disposed at an acute angle to the axis of said ring and normally retained in said position by said elastomer when unstressed, said angle being contrary to that where the greatest tipping force is intended to be exerted thereby preloading its action, the flow of the elastomer during tipping being at the ends of the annulus beyond the ring,
   whereby a force tending to tip one rod relative to the other is transmitted through the elastomer of the joint from the one rod to the other.

2. In a steering system having a generally horizontal and generally transverse intermediate arm and a pair of generally horizontal and generally transverse connecting rods, and a flex joint joining said rods to said arm, the improvement comprising:
   a joint member secured to each of said rod and having a ring at one end thereof, said ring having an opening therethrough extending along a generally horizontal axis which flares from a narrow diameter at the center to a wider diameter at each end;
   a pair of generally cylindrical horizontlly mounted studs, each said stud being connected to said intermediate arm transversely thereto and passing axially through said opening and having an enlarged head on the opposite side of said ring from said intermediate arm, said head being of sufficient size to prevent the stud from being pulled through said ring, and
   an elastomeric annulus bonded to both the inner surface of the ring and the outer surface of the stud and substantially filling the space between them,
   each said stud bonded in said elastomer with its axis disposed at an acute angle to its cooperating ring and normally retained in said position by the elastomer when unstressed, the angles being complementary to each other to thereby extend the studs in opposed directions in the straight ahead position of its corresponding road engaging wheel,
   whereby a force tending to tip said intermediate arm relative to said connecting rod is transmitted through the elastomer of the joint, so that there is relative tipping of said ring and stud in a generally horizontal plane when said steering wheel is turned, while also providing shock absorption by limited relative translation of said ring and stud against said elastomer, and also enabling said connecting rod to follow vertical movement of its associated said road-engaging wheel by limited relative rotation of the ring and the stud.

References Cited

UNITED STATES PATENTS

| | | | |
|---|---|---|---|
| 2,047,976 | 7/1936 | Lord | 287—85 |
| 2,319,463 | 5/1943 | Lear | 287—85 X |
| 2,324,984 | 7/1943 | Brown | 287—90 |
| 3,275,352 | 9/1966 | Peickii et al. | 287—85 |

FOREIGN PATENTS 1,008,129  5/1957  Germany.

CARL W. TOMLIN, *Primary Examiner.*

A. V. KUNDRAT, *Assistant Examiner.*

UNITED STATES PATENT OFFICE

CERTIFICATE OF CORRECTION

Patent No. 3,365,213　　　　　　　　　　　　January 23, 1968

Gustavus A. Bentley et al.

It is certified that error appears in the above identified patent and that said Letters Patent are hereby corrected as shown below:

Column 1, line 58, for "inbetween" read -- in between --; column 6, line 3, before "from" insert -- ring --; line 6, for "vaidless" read -- voidless --; line 31, for "horizontlly" read -- horizontally --.

Signed and sealed this 15th day of July 1969.

(SEAL)
Attest:

Edward M. Fletcher, Jr.　　　　　　　　WILLIAM E. SCHUYLER, JR.
Attesting Officer　　　　　　　　　　　　　Commissioner of Patents